(12) United States Patent
Allpress et al.

(10) Patent No.: US 6,317,410 B1
(45) Date of Patent: Nov. 13, 2001

(54) RECEIVER ARCHITECTURE EMPLOYING SPACE TIME SPREADING AND ORTHOGONAL TRANSMIT DIVERSITY TECHNIQUES

(75) Inventors: Stephen Alan Allpress, Hoboken; R. Michael Buehrer, Morristown; Robert Atmaram Soni, Morris Plains, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/395,325

(22) Filed: Sep. 13, 1999

(51) Int. Cl.[7] .............................. H04J 11/00; H04J 13/00
(52) U.S. Cl. ........................................... 370/203; 370/342
(58) Field of Search .................................... 370/203, 208, 370/209, 335, 342, 479; 375/130, 147, 149, 136

(56) References Cited

U.S. PATENT DOCUMENTS

| | | | |
|---|---|---|---|
| 6,154,485 | * 11/2000 | Harrison | 375/130 |
| 6,173,005 | * 1/2001 | Kotzin et al. | 375/141 |
| 6,185,266 | * 2/2001 | Kuchi et al. | 375/347 |

* cited by examiner

*Primary Examiner*—Douglas Olms
*Assistant Examiner*—Ken Vanderpuye

(57) ABSTRACT

Disclosed is a receiver transmitter architecture having incorporated both open loop transmit diversity schemes using a plurality of binary switches. Employment of binary switches allows for the sharing of certain components whether the receiver is utilizing a orthogonal transmit diversity (OTD) scheme or a space time spreading (STS) scheme. Accordingly, the number of components in the receiver is minimized and the complexity of the receiver is simple enough to be implemented into a single application specific integrated chip.

16 Claims, 2 Drawing Sheets

RECEIVER ARCHITECTURE EMPLOYING SPACE TIME SPREADING AND ORTHOGONAL TRANSMIT DIVERSITY TECHNIQUES

RELATED APPLICATION

Related subject matter is disclosed in the following application and assigned to the same assignee hereof: U.S. patent application Ser. No. 09/294,661 entitled, "Method And Apparatus For Downlink Diversity In CDMA Using Walsh Codes," inventors R. Michael Buehrer, Robert Atmaram Soni, and Jiann-an Tsai, filed on Apr. 19, 1999. Related subject matter is disclosed in the following concurrently filed application and assigned to the same assignee hereof: U.S. patent application Ser. No. 09/394,172 entitled, "A Transmitter Architecture Employing Space Time Spreading And Orthogonal Transmit Diversity Techniques," inventors R. Michael Buelirer, Robert Atmaram Soni, Stephen A. Allpress, Quinn Li and Nallepilli Ramesh.

FIELD OF THE INVENTION

The present invention relates generally to wireless communication systems and, in particular, to wireless communication employing transmit diversity.

BACKGROUND OF THE RELATED ART

Several third generation wireless communication systems are being developed. One such third generation wireless communication system is known as CDMA 2000. In CDMA 2000, a variety of techniques are being incorporated for improving call quality. Open loop transmit diversity is one Such technique in which user signals are transmitted using two antennas. In a first phase of CDMA 2000, open loop transmit diversity is currently being implemented in a form of orthogonal transmit diversity (OTD). In OTD, separate antennas are used to transmit even data bits and odd data bits to achieve transmit diversity and improved call quality.

In a second phase of CDMA 2000, open loop transmit diversity may be implemented in a for in of space time spreading (STS) using Walsh functions or codes. STS enhances call quality by providing variable gain over OTD depending on the coding rate being used. Specifically, in STS, odd data bits and even data bits are jointly, not separately, transmitted over two antennas. However, the manner in which tile odd and even data bits are modulated/processed before being transmitted over one antenna will be different from the manner in which the odd and even data bits are modulated/processed being transmitted over the other antenna.

There has been some concern that including both open loop transmit diversity schemes as options in CDMA 2000 would be very complex in terms of implementing them into a common transmitter architecture. Accordingly, there exists a need for a simple to implement common receiver architecture that has incorporated orthogonal transmit diversity and space time spreading schemes.

SUMMARY OF THE INVENTION

The present invention is a common receiver architecture having incorporated both open loop transmit diversity schemes using a plurality of binary switches. Employment of binary switches allows for the sharing of certain components whether the receiver is utilizing a orthogonal transmit diversity (OTD) scheme or a space time spreading (STS) scheme. Accordingly, the number of components in the receiver is minimized and the complexity of the receiver is simple enough to be implemented into a single application specific integrated chip.

The receiver operates in an OTD and a STS mode, and comprises mixers and adders. The mixers mix a received signal with a first function to produce a first mixed signal, and the received signal with a second function to produce a second mixed signal, wherein the second function is a complement of the first function. The first mixed signal is mixed with a conjugate of a first channel estimate to produce a third mixed signal, and with a conjugate of a second channel estimate to produce a fourth mixed signal. The second mixed signal is mixed with the conjugate of the second channel estimate to produce a fifth mixed signal. A conjugate of the second mixed signal is mixed with the first channel estimate to produce a sixth mixed signal. In OTD mode, the third and fifth mixed signals are time multiplexed together to produce a version of the transmitted signal. In STS mode, the third mixed signal and a conjugate of the fifth mixed signal are added together by an adder to produce a first added signal, and the fourth mixed signal and an inverted sixth mixed signal are added together by an adder to produce a second added signal, wherein the first and second added signals are time multiplexed together to produce a version of the transmitted signal.

BRIEF DESCRIPTION OF THE DRAWINGS

The features, aspects and advantages of the present invention will become better understood with regard to the following description, appended claims, and accompanying drawings where:

DETAILED DESCRIPTION

Figure 1:
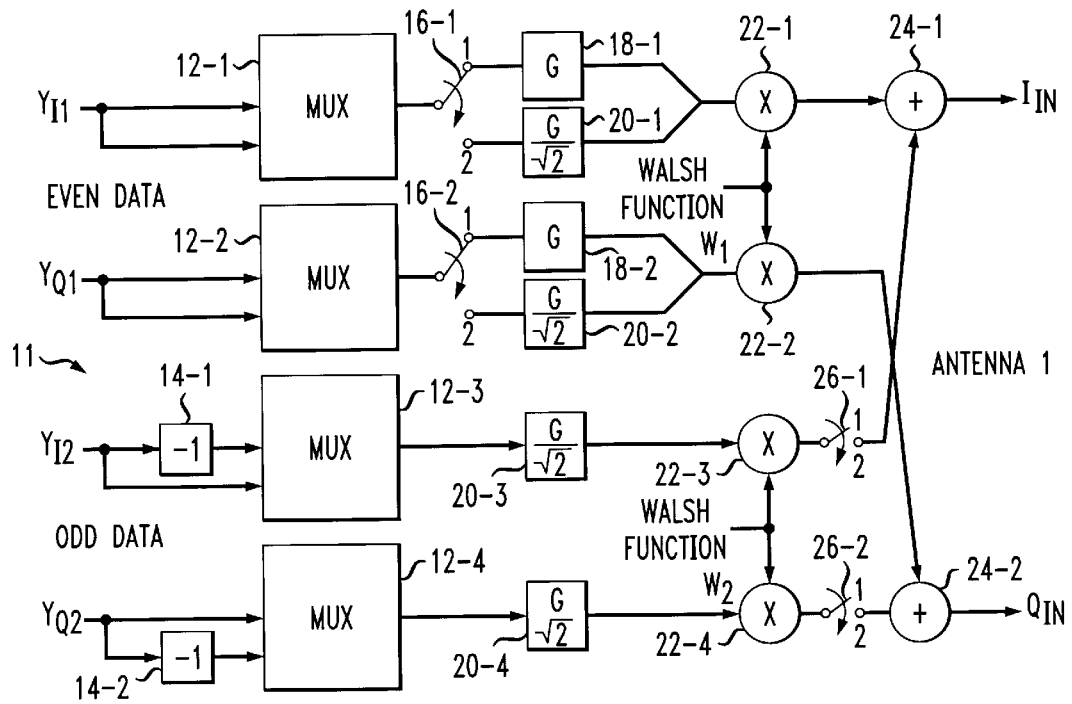
FIG. 1 depicts a transmitter employing orthogonal transmit diversity and space time spreading using Walsh functions in accordance with the present invention.
Figure 1:
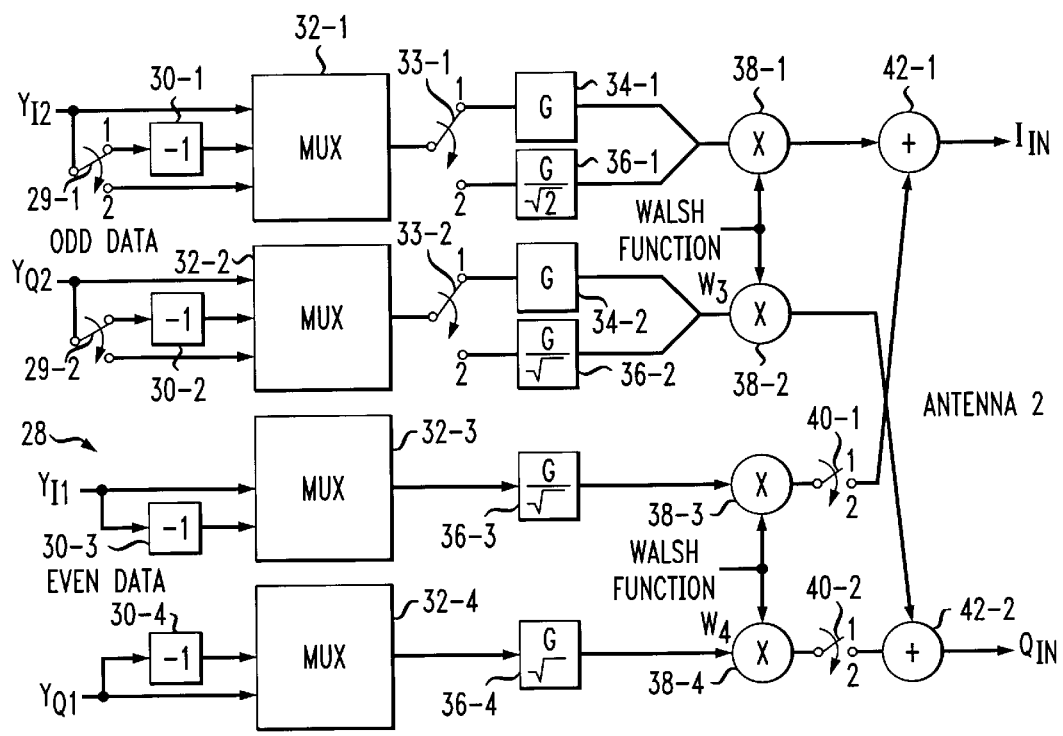

FIG. 1 depicts a common transmitter architecture 10 in accordance with the present invention. Transmitter 10 is typically incorporated at a base station, and is operable to modulate/process user signals employing either orthogonal transmit diversity or space time spreading (using Walsh or some other orthiogonial function) techniques. Transmitter 10 comprises of a first antenna system 11 and a second antenna system 28. For ease of discussion, the present invention will be described herein with respect to one user signal. It should be understood, however, that the present invention can be applied to multiple user signals.

Transmitter 10 receives a user signal Y. Before user signal is modulated/processed by first and/or second antenna systems 11 and 28, user signal Y is parsed and partitioned into even and odd data bits and then into in-phase and quadrature phase signals, i.e. signal Y is converted into signals $Y_{I1}, Y_{Q1}, Y_{I2}$, and $Y_{Q2}$, wherein I represents an in-phase signal, Q represents a quadrature phase signal, 1 represents even data bits and 2 represents odd data bits. Signals $Y_{I1}, Y_{Q1}, Y_{I2}$, and $Y_{Q2}$ are provided as inputs to first and second antenna systems 11 and 28.

First antenna system 11 comprises time multiplexers 12, inverters 14, switches 16 and 26, amplifiers 18 and 20, mixers 22 and adders 24. Switches 16 and 26 have a first position and second position. When switches 16 and 26 are all in the first position, first antenna system 11 operates in orthogonal transmit diversity mode. By contrast, when switches 16 and 26 are all in the second position, first antenna system 11 operates in space time spreading mode.

User signal $Y_{I1}$ is provided twice as input to time multiplexer 12-1. The output of time multiplexer 12-1 is a time multiplexed signal of signal $Y_{I1}$ with itself. When switch 16-1 is in the first position, i.e., OTD mode, the output of time multiplexer 12-1 is directed to amplifier 18-1 where it is amplified a gain G by amplifier 18-1. When switch 16-1 is in the second position, i.e., STS mode, the Output Of time multiplexed 12-1 is directed to amplifier 20-1 where it is amplified a gain $$\frac{G}{\sqrt{2}}$$

by amplifier 20-1.

The outputs of amplifier 18-1 and amplifier 20-1 are mixed at mixer 22-1 with a Walsh function $W_1$, and then provided as input to adder 24-1. Note that mixer 22-1 should only receive an input from either amplifier 18-1 or 20-1 at any one time, and that some other orthogonal (or quasi-orthogonal or quasi-Walsh) function may be used to mix the output of amplifier 18-1 and 20-1 instead of Walsh functions. If first antenna system 11 is in STS mode, i.e., switches 16 and 26 are all in the second position, the output of mixer 22-1 is added to an output of mixer 22-3 by adder 24-1 before being transmitted. By contrast, if first antenna system 11 is in OTD mode, i.e., switches 16 and 26 are all in the first position, the output of mixer 22-1 is not added to the output of mixer 22-3 by adder 24-1 before being transmitted.

User signal $Y_{Q1}$ is processed in a similar manner as user signal $Y_{I1}$ using time multiplexer 12-2, switch 16-2, amplifiers 18-2 and 20-2, mixer 22-2, adder 24-2 and Walsh function $W_1$.

User signal $Y_{I2}$ is provided as input to time multiplexer 12-3 along with an inverted signal of $Y_{I2}$ (i.e. output of inverter 14-1). The output of the time multiplexer 12-3 is then provided as input to amplifier 20-3, where it is amplified a gain $$\frac{G}{\sqrt{2}}.$$

The output of amplifier 20-3 is mixed with a Walsh function $W_2$ by mixer 22-3. When switch 26-1 is in the second position, the output of mixer 22-3 is provided as input to adder 24-1 where it can be added to the output of mixer 22-1. By contrast, when switch 26-1 is in the first position, the output of mixer 22-3 is not provided as input to adder 24-1.

Note that the amplifiers used by first antenna system 11 has a gain of $$\frac{G}{\sqrt{2}}$$

when it is in STS mode and a gain of G when it is in OTD mode. Such configuration allows for a same output power by first antenna system 11 regardless of the mode. But it should be understood that any configuration of amplifiers and gains may be used. Further note that when first antenna system 11 is in OTD mode, it transmits only even data bits. By contrast, when first antenna system 11 is in STS mode, it transmits its both even and odd data bits.

User signal $Y_{Q2}$ is processed in a similar manner as signal $Y_{I2}$ using time multiplexer 12-4, inverter 14-2, amplifier 20-4, mixer 22-4, switch 26-2, adder 24-2 and Walsh function $W_2$.

Second antenna system 28 comprises switches 29, 33 and 40, inverters 30, time multiplexers 32, amplifiers 34 and 36, mixers 38 and adders 42. Switches 29, 33 and 40 have a first and second position. When switches 29, 33 and 40 are in the first position, second antenna system 28 operates in OTD mode. By contrast, when switches 29, 33, and 40 are in the second position, second antenna system 28 operates in STS mode.

When switch 29-1 Is in the first position, user signal $Y_{I2}$ is provided as input to time multiplexer 32-1 along with an inverted user signal $Y_{I2}$ (i.e., output of inverter 30-1). When switch 29-1 is in the second position, user signal $Y_{I2}$ is provided twice as input to time multiplexer 32-1. In time multiplexer 32-1, user signal $Y_{I2}$ is time multiplexed with itself or its inverted self depending on the position of switch 29-1 (or mode of second antenna system 28).

When switch 33-1 is in the first position, the output of time multiplexer 32-1 is directed to amplifier 34-1, where the time multiplexed signal is amplified a gain G by amplifier 34-1. When switch 33-1 is in the second position, the output of time multiplexer 32-1 is directed to amplifier 36-1, where the time multiplexed signal is amplified a gain $$\frac{G}{\sqrt{2}}$$

by amplifier 36-1.

The outputs of amplifiers 34-1 and 36-1 are provided as input to mixer 38-1, where they are mixed with Walsh functions $W_3$. Note that mixer 38-1 should only receive an input from either amplifier 34-1 or 36-1 at any one time, not both simultaneously. If second antenna system 28 is in STS mode, i.e., switches 29, 33 and 40 are all in the second position, the output of mixer 38-1 is added to an output of mixer 38-3 by adder 42-1 before being transmitted. By contrast, if second antenna system 28 is in OTD mode, i.e., switches 29, 33 and 40 are all in the first position, the output of mixer 38-1 is not added to the output of mixer 38-3 by adder 42-1 before being transmitted.

User signal $Y_{Q2}$ is processed in a similar manner to user signal $Y_{I2}$ using switches 29-2, 33-2 and 40-2, inverter 30-2, time multiplexer 32-2, ampilifiers 34-2 and 36-2, mixer 38-2, adder 42-2 and Walsh function $W_3$.

User signal $Y_{I1}$ is provided as input to time multiplexer 32-3 along with an inverted user signal $Y_{I2}$. In time multiplexer 32-3, user signal $Y_{s11}$ is time multiplexed with its inverted self. The output of time multiplexer 32-3 is amplified a gain $$\frac{G}{\sqrt{2}}$$

by amplifier 36-3.

The output of amplifier 36-3 is mixed in mixer 38-3 with Walsh function $W_4$. When switch 40-1 is in the second position, the output of mixer 38-3 is provided as input to adder 42-1 where it is added to the output of mixer 38-1. When switch 40-1 is in the first position, the output of mixer 38-3 is not provided as input to adder 42-1.

User signal $Y_{Q1}$ is processed in a similar manner to user signal $Y_{I1}$ using inverter 30-4, time multiplexer 32-4, amplifier 36-4, mixers 38-4, switch 40-2 and adder 42-2.

Note that, like the amplifiers of first antenna system 11, the amplifiers of second antenna system 28 has a gain of $$\frac{G}{\sqrt{2}}$$

when it is in STS mode and a gain of G when it is in OTD mode. Such configuration allows for a same output power by second antenna system 11 regardless of the mode. But it should be understood that any configuration of amplifiers and gains may be used. Further note that when second antenna system 28 is in OTD mode, it transmits only odd data bits. By contrast, when second antenna system 28 is in STS mode, it transmits both even and odd data bits.

In a preferred embodiment, Walsh functions $W_1$, $W_2$, $W_3$ and $W_4$ are identical. Note that for ease of discussion, a common receiver architecture is disclosed herein that assumes that Walsh functions $W_1$, $W_2$, $W_3$ and $W_4$ are identical. It should be understood that the different Walsh functions $W_1$, $W_2$, $W_3$ and $W_4$ or combinations thereof may also be used, and that the common receiver architecture disclosed herein could be adapted for different Walsh functions $W_1$, $W_2$, $W_3$ and $W_4$ or combination is thereof.

Figure 2:
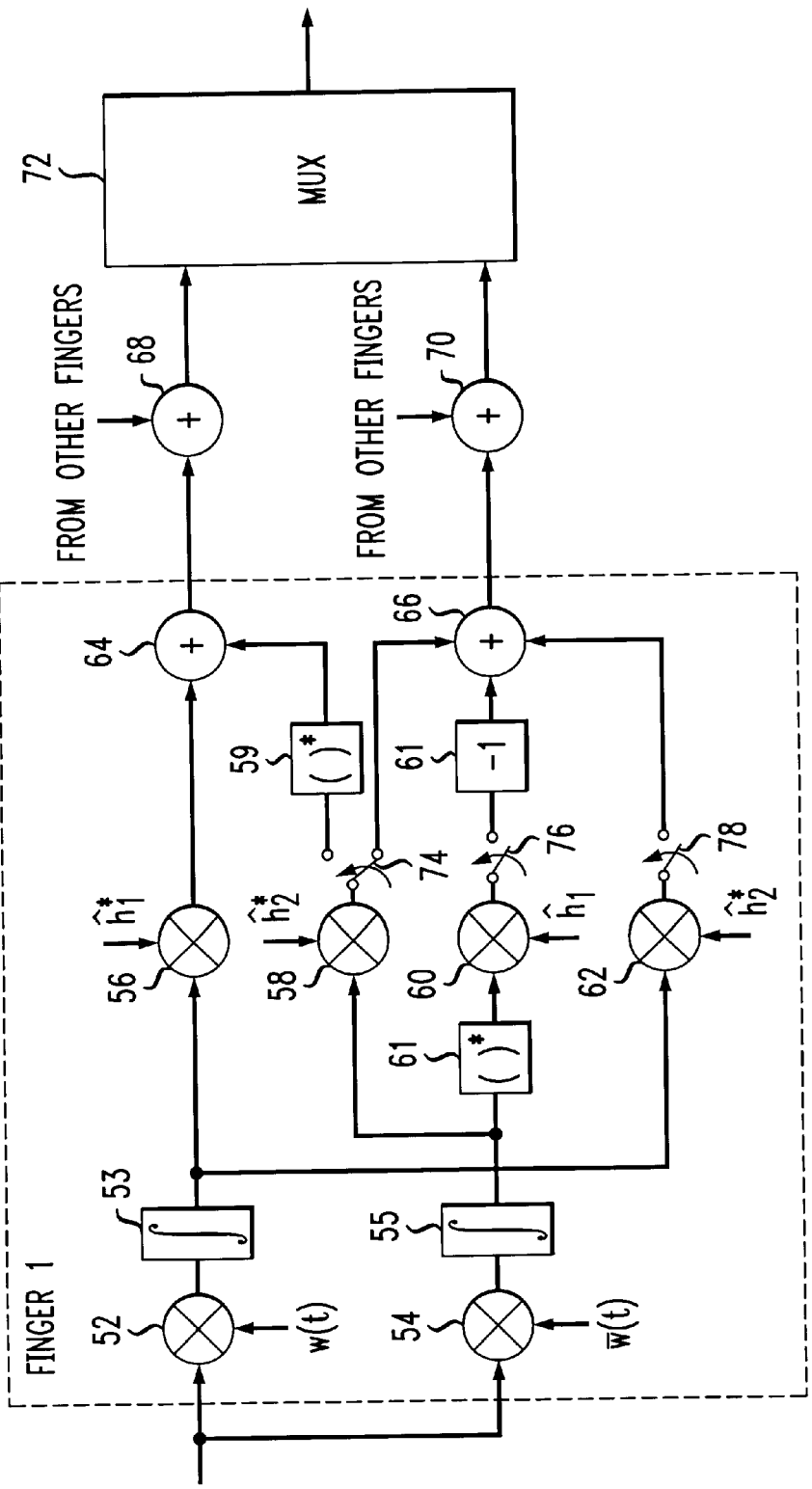
FIG. 2 depicts one finger of a receiver employing orthogonal transmit diversity and space time spreading using Walsh functions in accordance with the present invention.

Opposite of transmitter 10 is a receiver (typically incorporated at a mobile-station) for receiving and demodulating/processing the signals transmitted by transmitter 10. FIG. 2 depicts one finger 50 of a common receiver architecture in accordance with the present invention. Finger 50 being operable to demodulate/process received signals (transmitted by transmitter 10 or equivalent) employing either orthogonal transmit diversity or space time spreading (using Walsh or some other orthogonal function) techniques. Finger 50 comprises mixers 52, 54, 56, 58, 60 and 62, adders 64, 66, 68 and 70, time multiplexer 72, inverters 59, 61 and 63, integrators 53 and 55 and switches 74, 76 and 78. Switches 74, 76 and 78 have a first and a second position. When switches 74, 76 and 78 are all in the first position, finger 50 operates in OTD mode. By contrast, when switches 74, 76 and 78 are all in the second position, finger 50 operates in STS mode.

When finger 50 receives a signal r(t), received signal r(t) is provided as inputs to mixers 52 and 54. In mixer 52, received signal r(t) is mixed with an extended Walsh function w(t), i.e., repeated Walsh function w(t). The output of in mixer 52 is provided as input to integrator 53. In mixer 54, received signal r(t) is mixed with a function $\overline{w}(t)$, which is a complement of the extended Walsh function w(t). The output of mixer 54 is provided as input to integrator 55. Recall that for ease of discussion, it is assumed that Walsh functions $W_1$, $W_2$, $W_3$ and $W_4$ are identical at transmitter 10. Accordingly, Walsh functionw(t) is identical to Walsh functions $W_1$, $W_2$, $W_3$ and $W_4$.

In integrators 53 and 55, the outputs of mixers 52 and 54 are integrated over the length of the Walsh functions w(t) or $\overline{w}(t)$ (or symbol rate) and then dumped. Note that the mixers 52 and 54 mixes at a chip rate. The output of integrator 53 is provided as inputs to mixers 56 and 62. The output of integrator 55 is provided as input to mixer 58, and a conjugate of the output of mixer 54 is provided as input to mixer 60, wherein the conjugate of the output of mixer 54 is obtained by inverting a quadrature stream of the output of mixer 54 using inverter 61.

In mixer 56, the output of mixer 52 is mixed with a signal $\vec{h}_1^*$ representing a conjugate of a channel estimate for first antenna system 11. In mixer 62, the output of mixer 52 is mixed with a signal $\vec{h}_2^*$ representing a conjugate of a channel estimate for second antenna system 28. In mixer 58, the output of mixer 54 is mixed with the signal $\vec{h}_2^*$. In mixer 60, the conjugate of the output of mixer 54 is mixed with a signal $\vec{h}_1$ representing a channel estimate for a first antenna system 11. Note that, in one embodiment, the channel estimates for first and second antenna systems 11 and 28 are obtained using pilot signals transmitted from first and second antenna systems 11 and 28, respectively.

The output of mixer 56 is provided as input to adder 64. When switch 74 is in the second position, a conjugate of the output of mixer 58 is also provided as input to adder 64 where the conjugate of tile output of mixer 58 and the output of mixer 56 are added together. Note that the conjugate of the output of mixer 58 is obtained by inverting a quadrature stream of the output of mixer 58 using inverter 59. The output of adder 64 is provided as input to adder 68, where it is added with outputs of same relative mixers from other fingers.

When switch 74 is in the first position, the output of mixer 58 is provided as input to adder 66. When switches 76 and 78 are in the second position, an inverted output of mixer 60 (via inverter 63) and the output of mixer 62 are provided as inputs to adder 66. When switches 76 and 78 are in the first position, the inverted output of mixer 60 and the output of mixers 62 are not provided as inputs to adder 66. Note that the output mixer 58 should not be provided as input to adder 66 at tile same time as the inverted output of mixer 60 and output of mixer 62. The output of adder 66 is provided as input to adder 70, where it is added with outputs of same relative mixers from other fingers.

The outputs of adders 68 and 70 are time multiplexed with each other by time multiplexer 72 and directed to a decoder, not shown. Note that in either mode, output of mixer 64 corresponds to a transmitted version of the even data bits and the output of mixer 66 corresponds to a transmitted version of the odd data bits.

The present invention is described herein with reference to certain embodiments, such as wireless communication systems based on third generation code division multiple access techniques. It should be understood that the present invention may be applicable to wireless communications based on other multiple access techniques. Additionally, instead of even and odd data bits for a same user signal, the present invention may be applied to even and odd data bits for different user signals or some other combinations. The present invention may also be applied to two identical non-partitioned (into odd and even data bits) user signals. Accordingly. the present invention should not be limited to the embodiments disclosed herein.

We claim:

1. A receiver having a first and second operating mode comprising:

a first mixer for mixing a received signal with a first function, a second mixer for mixing the received signal with a second function, the second function being a complement of the first function;

a third mixer for mixing an output of the first mixer with a conjugate of a first channel estimate;

a fourth mixer for mixing an output of the second mixer with a conjugate of a second channel estimate;

a fifth mixer for mixing a conjugate of the output of the second mixer with the first channel estimate;

a sixth mixer for mixing the output of the first mixer with the conjugate of the second channel estimate;

a first adder for adding an output of the third mixer with a conjugate of an output of the fourth mixer when the receiver is in the second operating mode and not when the receiver is in the first operating mode;

a second adder for adding an inverted output of the fifth mixer with an output of the sixth mixer when the receiver is in the second operating mode and not when the receiver is in the first operating mode.

2. The receiver of claim 1, wherein the output of the third mixer is directed to the first adder, the receiver further comprising:

a first switch for directing the output of the fourth mixer to the second adder when the receiver is in the first operating mode and for directing the conjugate of the output of the fourth mixer to the first adder when the receiver is in the second operating mode;

a second switch for directing the output of the fifth mixer to the second adder when the receiver is in the second operating mode and not when the receiver is in the first operating mode; and a third switch for directing the output of the sixth mixer to the second adder when the receiver is in the second operating mode and not when the receiver is in the first operating mode.

3. The receiver of claim 1 further comprising:

a first integrator for integrating the output of the first mixer at a symbol rate before being provided to the third and sixth mixers; and a second integrator for integrating the output of the second mixer at the symbol rate before being provided to the fourth and fifth mixers.

4. The receiver of claim 1 further comprising:

an inverter for inverting a quadrature stream of the output of the second mixer to produce the conjugate of the output of the second mixer.

5. The receiver of claim 1 further comprising:

an inverter for inverting a quadrature stream of the output of the fourth mixer to produce the conjugate of the output of the fourth mixer.

6. The receiver of claim 1 further comprising:

an inverter for inverting the output of the fifth mixer to produce the inverted output of the fifth mixer.

7. The receiver of claim 1 further comprising:

a third adder for adding an output of the first adder to an output of a second receiver; and a fourth adder for adding an output of the second adder to an output of the second receiver.

8. The receiver of claim 1 further comprising:

a time multiplexer for time multiplexing an output of the first adder with an output of a second adder.

9. The receiver of claim 1, wherein the first function is an orthogonal function.

10. The receiver of claim 9, wherein the orthogonal function is a Walsh function.

11. The receiver of claim 1, wherein the first function is a quasi-orthogonal function.

12. The receiver of claim 1, wherein the first function is an orthogonal function.

13. The receiver of claim 12, wherein the orthogonal function is a Walsh function.

14. The receiver of claim 1, wherein the first function is a quasi-orthogonal function.

15. The receiver of claim 1, wherein the first and second functions are identical.

16. The receiver of claim 1, wherein the first and second functions are different.

* * * * *